United States Patent Office 3,562,836
Patented Feb. 16, 1971

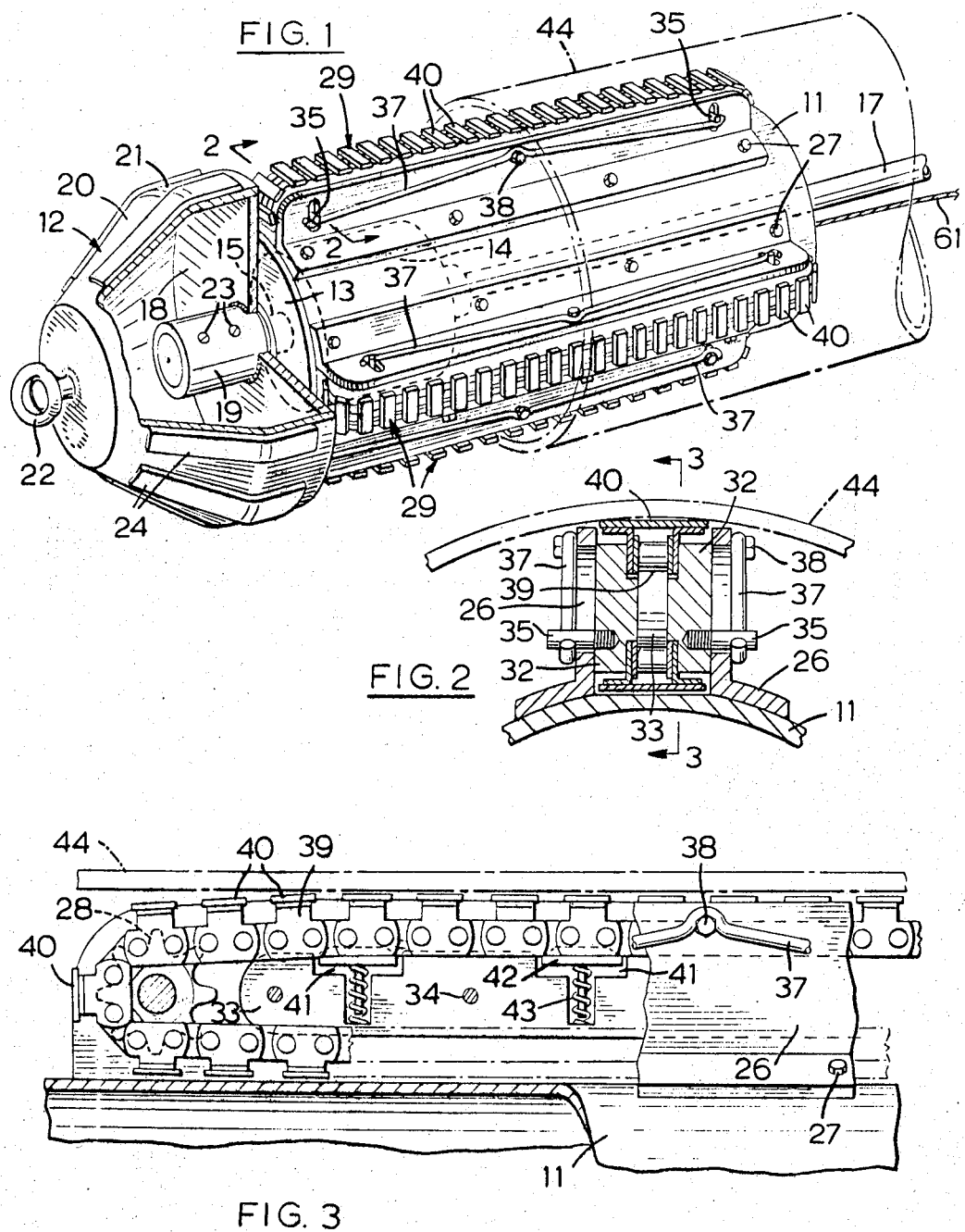

3,562,836
REAMING TOOL
James McGhee Frew, Weston, and Raymond Muir Bremner, Don Mills, Ontario, Canada, assignors to Raymond M. Bremner, Don Mills, Ontario, Canada
Filed Dec. 30, 1968, Ser. No. 787,933
Int. Cl. B08b 9/04
U.S. Cl. 15—104.3      11 Claims

ABSTRACT OF THE DISCLOSURE

A reaming tool for reaming the internal surface of a pipe comprises a rotary reaming head mounted at one end of a cylindrical housing in which a motor for driving the reaming head is mounted. A plurality of endless tracks mounted externally of the housing and extending along the sides thereof are provided with friction pads, which engage the inner surface of the pipe to prevent rotation of the housing within the pipe. The reaming tool is drawn through the pipe by means of a tow cable connected to a swivel coupling mounted on the reaming head.

BACKGROUND OF THE INVENTION

This invention relates to reaming tools for reaming the internal surfaces of pipes, more particularly sewer pipes in cities, municipalities, townships and villages, but also waste pipes used in chemical and industrial plants.

In copending patent application No. 773,084 of R. M. Bremner for "Pipe Relining Method and Apparatus," there is described a process for relining such pipes, which relining process involves the preliminary step of reaming the existing pipe to cut and remove any obstructions and protrusions. Such obstructions and protrusions consist of very hard, rock-like, calcite deposits which form on the internal surface of the pipe after a long period of use, as well as obstructions presented by the ends of misaligned pipe sections and the protruding ends of lateral drains. The necessity of cutting and removing these obstructions and protrusions in order to provide a uniform bore presents very serious problems.

Machines and apparatus for cleaning the interiors of pipes have been previously proposed, but it is note-worthy that such machines and apparatus were intended for removing soft, loose material, and were not intended for use in conditions where positive control by an external operator is essential.

For example, U.S. Pat. No. 2,322,508, issued to Hubert R. Crane and dated June 22, 1943, discloses a pipe bore cleaning apparatus consisting essentially of a train of scrapers and scoops which are flushed along the pipe bore by water pressure. This apparatus is suitable for removing loose or soft materials which obstruct the pipe bore, but cannot be used to overcomt the obstructions presented by hard calcite deposits, misalignment of pipe sections, and protruding lateral drains.

Also, an apparatus for cleaning pipes and conduits and stringing cables therethrough is disclosed in U. S. Pat. No. 1,933,624, issued to James Guthrie and dated Nov. 7, 1933. This apparatus comprises a self-propelled vehicle having endless flexible tracks and a material dislodging tool projecting forwardly of the vehicle. The material dislodging tool is intended for dislodging loose, relatively soft material and could not be used to remove obstructions of the type contemplated herein. One of the features of Guthrie's self-propelled apparatus is that the material lodging tool and the endless tracks are driven from a common motor through gearing, and so the speed of the tool is necessarily related to the speed of the vehicle; the apparatus could not be used, therefore, to remove intractable obstructions occurring at irregular intervals.

The main object of the present invention is to provide a reaming tool which is positively controlled and which is suitable for performing reaming operations of the type described herein.

SUMMARY OF THE INVENTION

According to the present invention, a reaming tool for reaming the internal surface of a pipe comprises a reaming head adapted to be driven by a motor mounted within a cylindrical housing, and a plurality of circumferentially spaced idler means mounted on the housing externally thereof, said idler means carrying means for frictionally engaging the internal surface of the pipe. The tool is towed through the pipe by a tow cable connected to a swivel coupling mounted at the front end of the reaming head. Since the tool runs on idlers and is towed through the pipe by external means, the applied traction force can be adjusted independently of the drive motor for the reaming head, thus permitting much higher traction forces than would be practicable in the case of a self-propelled reaming tool and also permitting ready retrieval of the tool if necessary.

BRIEF DESCRIPTION OF THE DRAWINGS

One reaming tool in accordance with the present invention will now be described by way of example with reference to the accompanying drawings, in which:

FIG. 1 is a perspective view, partly broken away, of the reaming tool;

FIG. 2 is a section on line 2—2 in FIG. 1;

FIG. 3 is a section on line 3—3 in FIG. 2;

DESCRIPTION OF THE PREFERRED EMBODIMENT

Figure 4:
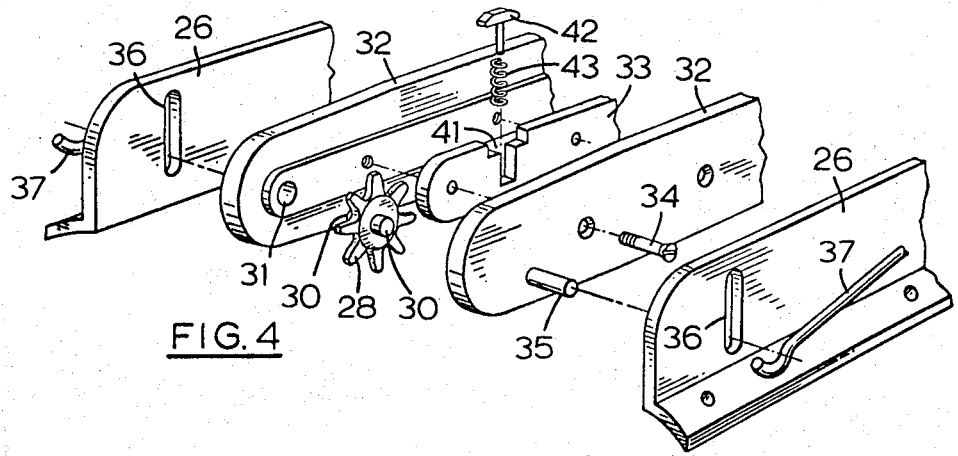
FIG. 4 is an enlarged, exploded perspective view of the detail shown in FIG. 2.

Referring to the drawings, the reaming tool 10 comprises a cylindrical housing 11 and a reaming head 12. The front end of the housing is closed by a circular plate 13. Within the housing 11 is mounted a compressed air motor 14, having a rotary drive shaft 15 arranged coaxially with the housing 11 and projecting from the forward end thereof. Compressed air for driving the motor 14 is supplied to the motor from an air compressor 16 (FIG. 5) through a hose 17 which extends through the rear end of the housing 11 and is connected to the motor 14. The reaming head 12 is a hollow body of revolution consisting of a circular support plate 18 welded to an inwardly extending axial sleeve 19 and extending radially therefrom, a generally frusto-conical plate 20 having an outermost cylindrical flange portion 21 welded to the rim of the circular plate 18, and a swivel coupling 22 closing the forward end of the frusto-conical plate 20, the swivel coupling 22 and the sleeve 19 being axially aligned. The reaming head is mounted on the rotary shaft 15, so as to be driven thereby, by coupling the sleeve 19 to the rotary shaft 15 and securing them together by bolts 23.

Distributed around the reaming head 12 are twelve steel plates 24, the operative surfaces of which comprise particles of crushed carbide bonded to the steel surfaces of the plates with silver solder. The reaming head 12 is freely rotatable with respect to the swivel coupling 22, the latter being adapted for the connection of a tow cable 25 as shown in FIG. 5.

A plurality of circumferentially spaced idler assemblies are mounted externally of the housing 11. Each of the idler assemblies is mounted between a pair of longitudinally extending radially projecting, flanged plates 26, which are bolted to the housing 11 by bolts 27. Each idler assembly comprises a pair of sprockets 28, which are longitudinally spaced with respect to the housing, and an endless track 29 carried by the sprockets. Each sprocket 28 has a pair of stub shafts 30 which are journalled in holes 31 provided on the inner surfaces of a pair of elongated guide plates 32, the latter being spaced apart by means of a spacer block 33 to which they are bolted by bolts 34. Projecting from the outer surfaces of the guide plates 32, near each end thereof, are two pins 35, which engage in radially extending slots 36 in the radial flanges of the flanged plates 26. As best seen in FIGS. 1 and 2, the idler assemblies are biassed radially outwardly by means of spring rods 37, which pass over bolts 38 projecting from the flanged plates 26 and engage underneath the projecting pins 35. Each endless track 29 comprises a flexible, endless chain 39 and a series of fraction pads 40 carried by the chain. The friction pads 40 are of steel with crushed carbide silver-soldered to their outer surfaces. The chain 39 passes round the sprockets 28 in driving engagement with them, the sprockets being idler sprockets to permit relative movement between the endless tracks and the housing. The spacer blocks 33 are provided each with a series of longitudinally spaced recesses 41. The recesses 41 accommodate thrust pads 42, which engage the chain 39 and are resiliently biassed by compression springs 43 to urge the endless tracks 29 radially outwardly so that the friction pads 40 are urged into frictional engagement with the internal surface of the pipe 44. By providing a series of thrust pads 42 for each endless track, different portions of the track are urged into engagement with the pipe 44 independently of one another, thus enabling the track to follow more readily variations in the pipe surface.

Figure 6:
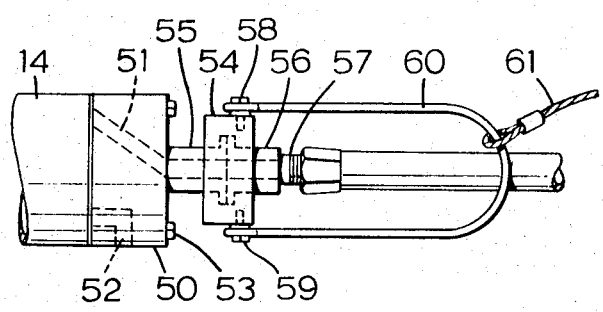
FIG. 6 is an enlarged sectional view of a detail of the reamer, showing swivel means for attaching a retrival cable.

Referring to FIG. 6, a connector block 50 providing an air inlet passage 51 and an air outlet passage 52 is secured to the motor by bolts 53. A swivel coupling 54 secures a first coupling member 55 and a second coupling member 56 which can rotate relatively to one another about their axes. The member 55 extends from the rear face of the block 50 to provide an air connection to the inlet passage 51, and a connector 57 is secured to the member 56 to provide for the attachment of an air hose to supply compressed air to the motor. Also pivotally secured to the swivel coupling 54 by pins 58, 59 is a connector loop 60 through which a retrieval cable 61 is threaded. The retrieval cable 61 is used for backing, or for retrieving the tool in use.

Figure 5:
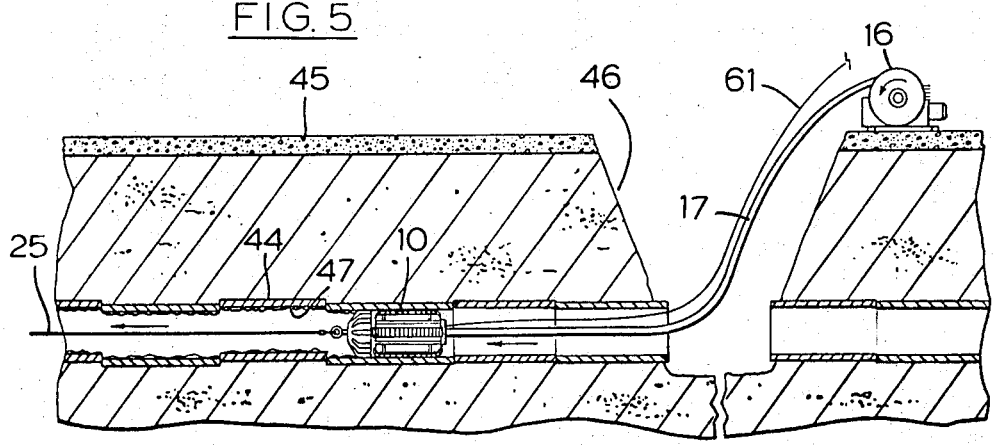
FIG. 5 is a longitudinal sectional view of a sewer pipe which is being reamed by a tool according to the present invention.

The manner of use of the reaming tool is illustrated in FIG. 5. The sewer pipe 44 to be reamed extends longitudinally beneath a road having a paved surface 45. Manholes (not shown) are provided at intervals along the length of the road to provide access to the sewer. An access shaft 46 is excavated at a distance (more or less three hundred feet) from a manhole, and the reaming tool 10 enters the pipe 44 from the access shaft.

The object of reaming the pipe 44, whether or not the pipe is to be relined by the process described in copending application Serial No. 773,084, of R. M. Bremner, is to remove any obstructions and protrusions. After a long period of use the inside of the pipe may become incrusted; the incrustations, shown at 47 in FIG. 5, together with protrusions of private drain connections into the pipe form obstructions, which effectively reduce the cross sectional area of the pipe and materially impair its flow characteristics. In the operation of the reaming tool 10, compressed air is supplied to the motor 14 by way of the hose 17, and the tool is towed through the pipe by means of the tow cable 25. The reaming head 12 is rotated by the motor, so that the operative or cutting surfaces of the plates 24 ream the internal surface of the pipe 44 and remove protrusions and obstructions therefrom. The housing 11, which carires the motor 14 is prevented from rotating by the tracks 29 which engage the internal surface of the pipe frictionally, the tracks 29 providing a large area of contact with the surface of the pipe.

As previously mentioned, the obstructions to be removed are very hard rock-like deposits and protruding ends of pipe; they are therefore very difficult to cut, and because of the resistance they present it would be quite impracticable in most cases to propel the reaming tool through a pipe at a constant speed. The use of a tow cable with an external traction motor, however, permits the travel speed of the reamer to adjust to the actual cutting conditions. Moreover, when a particularly difficult obstruction is encountered, it is possible to back the tool a short distance, by means of the retrieval cable, without any fear of the reamer head jamming. Having backed the tool, the operator then applied a traction force to the tow cable once again causing the tool to travel in the forward direction.

In this specification the housing 11 is described as a cylindrical housing. However, it will be appreciated that the housing need not be a complete enclosure, but could take the form of a cage, for example, within which the motor is housed, providing of course that the motor is suitably shielded from falling debris. Moreover, the housing need not be of circular cross section but could obviously be of square or other polygonal cross section approximating to circular. The term "cylindrical housing" in the specification and claims should therefore be construed accordingly.

What we claim as our invention is:

1. A reaming tool for reaming the internal surface of a pipe, comprising:
    (a) a cylindrical housing having front and rear ends;
    (b) attachment means within the housing for securing one end of a cable;
    (c) a motor mounted within the housing;
    (d) means for connecting the motor to a power supply;
    (e) a rotary shaft connected to the motor to be driven thereby, the rotary shaft being arranged coaxially with the housing and projecting from the front end thereof;
    (f) a reaming head mounted on said rotary shaft to be driven thereby, the reaming head being coaxial with the cylindrical housing;
    (g) a plurality of pairs of longitudinally spaced sprockets mounted on said housing externally thereof, said pairs of sprockets being circumferentially spaced around the housing;
    (h) a plurality of circumferentially spaced, longitudinally extending, endless tracks carried by respective pairs of sprockets;
    (i) a series of friction pads mounted on each of said endless tracks; and
    (j) swivel means for connecting a tow cable to the reaming head.

2. A reaming tool according to claim 1, in which the attachment means is a swivel coupling mounted on the motor.

3. A reaming tool according to claim 1, including means for resiliently urging the friction pads radially outwardly into engagement with the internal surface of the pipe.

4. A reaming tool for reaming the internal surface of a pipe, comprising:
    (a) a cylindrical housing having front and rear ends;
    (b) attachment means within the housing for securing one end of a cable;
    (c) a motor mounted within the housing;
    (d) means for connecting the motor to a power supply;
    (e) a rotary shaft connected to the motor to be driven thereby, the rotary shaft being arranged coaxially with the housing and projecting from the front end thereof;
    (f) a reaming head mounted on said rotary shaft to be driven thereby, the reaming head being coaxial with the cylindrical housing;

(g) a plurality of circumferentially spaced idler means mounted on said housing externally thereof;
(h) means adapted to engage frictionally the internal surface of the pipe, said pipe-engaging means being carried by said idler means; and
(i) swivel means for connecting a tow cable to the reaming head.

5. A reaming tool according to claim 4, in which the attachment means is a swivel coupling mounted on the motor.

6. A reaming tool according to claim 4, including means for resiliently urging the friction pads radially outwardly into engagement with the internal surface of the pipe.

7. A reaming tool according to claim 4, wherein the reaming head comprises a rotary body having a series of circumferentially spaced cutting members adapted to engage matter projecting from the internal surface of the pipe.

8. A reaming tool according to claim 7, wherein the reaming head is a hollow body of revolution comprising a frusto-conical plate terminating at one end in an outer cylindrical flange, a swivel coupling closing the other end of the frusto-conical plate, the swivel coupling being coaxial with said rotary shaft, a support plate connected to the rotary shaft and extending radially therefrom, the cylindrical flange being secured to the support plate, and a series of cutting members secured to the conical plate and circumferentially distributed therearound, the cutting members being adapted to engage matter projecting from the internal surface of a pipe to be reamed.

9. A reaming tool according to claim 8, wherein each cutting member comprises a steel plate having an operative surface comprising particles of abrasive bonded to the steel plate.

10. A reaming tool according to claim 1, wherein the motor is a compressed air motor, said means for connecting the motor to a power supply being means for delivering compressed air to the motor.

11. A reaming tool according to claim 3, wherein each of the longitudinally extending, endless tracks carried by a respective pair of sprockets is mounted between a pair of longitudinally extending plates mounted on said housing, and wherein the means for resiliently urging the friction pads radially outwardly into engagement with the internal surface of the pipe comprises a series of longitudinally spaced thrust pads and spring means for biassing the thrust pads into engagement with different portions of the track.

References Cited
UNITED STATES PATENTS

| | | | |
|---|---|---|---|
| 1,132,691 | 3/1915 | Sieben | 15—104.12 |
| 1,933,624 | 11/1933 | Guthrie | 15—104.3X |
| 3,056,155 | 10/1962 | Harmes | 15—104.12X |

EDWARD L. ROBERTS, Primary Examiner

U.S. Cl. X.R.

15—104.12